Patented Jan. 8, 1935

1,986,783

UNITED STATES PATENT OFFICE 1,986,783

PROCESS OF PREPARING BUTTER

Leon Adler, St. Louis, Mo.

No Drawing. Application May 6, 1933, Serial No. 669,676

2 Claims. (Cl. 99—13)

Inasmuch as butters made at different localities and at different times of the year vary in color to a greater or less degree, dependent upon various circumstances, an effort is and has been made by the different manufacturers, to produce butter of uniform color throughout the year from their various producing centers. After selecting a predetermined tint of yellow, said tint is made standard, and all butter produced by such a manufacturer will be substantially of said standard shade or tint. This tinting is done by the addition of suitable dyes or materials, and is well-known practice.

However, the usual manner of such tinting is to add such coloring preparation to the butter substantially after the churning of the cream has commenced and the butter-fat particles or globules have separated out of the cream. Even though the coloring preparation were added to the cream preliminary to churning, it would not combine or react with the fat to color the same, until the fat globules have commenced to separate out.

One of the principal objects of my invention is to simplify the steps required for the manufacture of butter and to more easily and accurately standardize the color of the same, and to this end, to introduce such a coloring agent that will actually color the cream itself, prior to the churning operation, and whereby the permeation of the color into the butter mass will be as speedy and completely uniform as is possible.

Another object of my invention is to color the cream to be churned, with a coloring preparation in the form of a dilute aqueous suspension of a water-insoluble but fat-soluble dye, so that this coloring preparation in such liquid condition is readily disseminated throughout the mass which is to be colored during the churning, the dye combining directly with the fat content of the mixture while the latter is in the liquid state and have not as yet begun to separate out as fat particles or globules, the other components of the coloring preparation either becoming dissolved in the water during the working of the butter, or coming to the exterior of the butter mass and from whence it is washed away at various intervals during the normal churning or working of the butter.

The invention has among its other objects, the production of a process for preparing butter, or other edible fats or oils, by coloring the same prior to or during the churning operation, and in which the resultant prepared butter will not have retained any appreciable amounts of foreign matter.

Other objects and advantages of the invention herein described will be obvious to those skilled in the art to which this invention relates, as will be apparent from the disclosures herein given.

To this end, my invention consists in the novel manner of preparing edible fats or oils into a substantially solidified mass, as will be more particularly pointed out in the claims.

The coloring of butter is quite common practice on account of the fact that lack of color, or of uniformity of color throughout the year and in various parts of the country leads some people to think that such differences of color indicate differences in quality of the product. Although the belief is an erroneous one, it is far easier to satisfy this standard than to educate purchasers to a different manner of reasoning, and the result is to tint the butter to suit.

Various dyes have been used for this purpose, such as for example, the well-known Yellow AB and Yellow OB colors, and which are generally used for the purpose in some diluted form as they are extremely concentrated in pigment form.

My previous application for patent, Serial No. 472,191, filed July 31, 1930, and of which this application is a continuation in part, discloses a coloring preparation that is extremely easy to use and which will keep over long periods of time without deterioration, and having an important characteristic, namely, that it will combine almost immediately with the cream liquid to color the same, and the butter fat need not have started to separate out before the coloring is begun. A further feature of this coloring preparation is that the resultant churned product does not retain any substantial amounts of foreign matter. The dispersing agent of the coloring preparation is water-soluble and is therefore largely or completely eliminated during the churning operation, by the wash water, whereas the oil-soluble coloring matter is retained and combined with the fat or oil.

As disclosed in said application, a suitable form of coloring preparation having the above characteristics, and found suitable for the purpose, is the following, in approximately the proportions stated, namely:

2 to 3 grams of oil-soluble coloring matter
100 grams of water
½ to 1 gram of gum-arabic The coloring matter is preferably oil-free, but oil-soluble, so that as little carrier oil as possible enter into the finished edible mass.

As was further set forth in said application, and in order to avoid freezing of the aqueous compound, especially during the cold seasons of the year, various additional ingredients may be incorporated, as for example, glycerin, in sufficient amounts to accomplish the desired result.

The preparation disclosed, as is obvious, is in the form of a dilute aqueous suspension in liquid condition, and when the same is added to the cream, or other edible fat or oil, it readily disseminates throughout the mass and combines with the cream even before the fat particles have separated out, and with the result that such cream is thus uniformly colored and consequently it is very easy to standardize the product. One knows immediately whether the required color has resulted, and it is not necessary to wait until after churning has been started or completed to find this out.

The cream, thus colored by adding the required amount of coloring preparation, is then churned, and during the consequent working, the carrier for the dye is worked out of the mass and is washed away with the wash water used at various intervals during churning, and whereby substantially only the dye itself will be retained in the resultant product, as it is entirely oil-soluble, and the other contents of the coloring preparation are either dissolved in the wash water or are washed away therewith.

The resultant butter retains only the coloring matter of the preparation and no substantial amount of foreign matter. Even the dispersing agent, being water soluble, is largely eliminated and carried off by the water, whereas the coloring matter combines with the fat or oil.

This pre-coloring of the liquid oil or fat is easily, quickly, and accurately carried out, and during the churning, as has been hereinbefore set forth, the oil-soluble coloring matter is retained in the butter, whereas the water and the dispersing agent separates from the butter and is readily removed during the normal working of the butter.

This manner of adding the coloring to the cream or milk, rather than to the butter after churning has begun, improves the quality of the butter, and there is positively no danger of "overworking" the butter and changing its form in any manner whatsoever. The oil dyes in ordinary use could not be used in the aforesaid manner, as they would form large globules in the cream, and which would not begin to combine with the fat until the butter fat has separated out from the cream. As the carrier for the coloring preparation of applicant's preparation is water-soluble, and the color itself combines substantially immediately with the cream itself prior to the separation out of the fat particles, it will have all of the advantages hereinbefore set forth.

What I claim as new and desire to secure by Letters Patent is:

1. The method of preparing an edible fat or oil into substantially solidified form, comprising adding an aqueous oil-free suspension in dilute liquid condition of an oil-soluble and water-insoluble dye to said fat or oil, said suspension also containing an inert oil-free dispersing agent, and then churning so as to work the carrier out of the coloring preparation and wash the same away, so that the resultant colored solidified product will be substantially free of said suspension except for said dye.

2. The method of preparing butter comprising adding an aqueous, oil-free suspension in dilute liquid condition of an oil-soluble and water-insoluble dye to cream, said suspension also containing an oil-free dispersing agent, churning the mixture so as to convert the fat content of the cream into butter, and working the carrier out of the coloring preparation and washing the same away so that the resultant butter will be substantially free of said suspension except for said dye.

LEON ADLER.